G. W. BLAKE.
Hanger for Steam and Gas Pipes.
No. 168,217.  Patented Sept. 28, 1875.
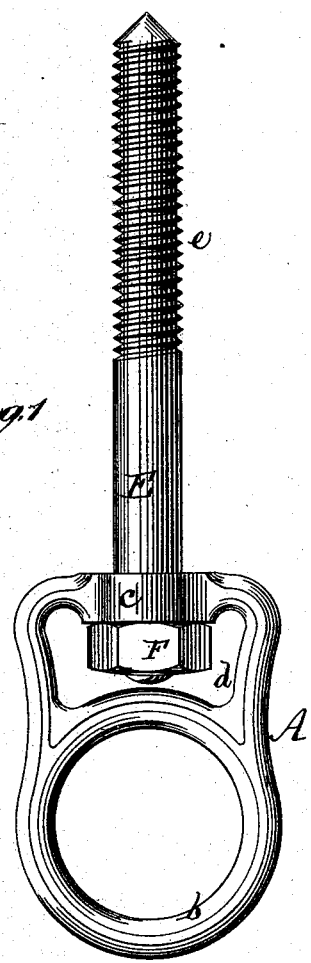
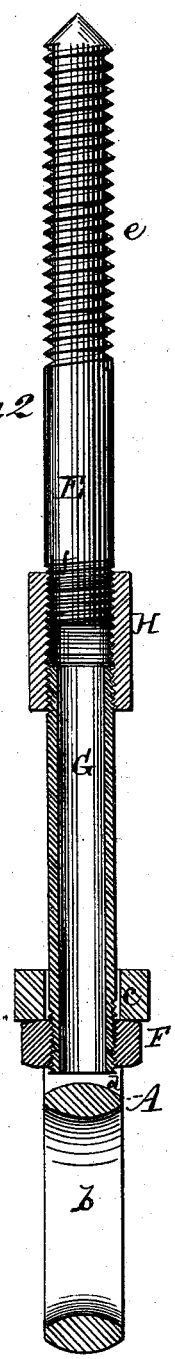

UNITED STATES PATENT OFFICE.

GEORGE W. BLAKE, OF NEW YORK, N. Y.

IMPROVEMENT IN HANGERS FOR STEAM AND GAS PIPES.

Specification forming part of Letters Patent No. 168,217, dated September 28, 1875; application filed June 11, 1875.

*To all whom it may concern:*

Be it known that I, GEORGE W. BLAKE, of New York, in the county and State of New York, have invented an Improved Hanger for Steam and Gas Pipes; and I do hereby declare that the following is a full, clear, and exact description of the same, reference being had to the accompanying drawing, which forms part of this specification.

My invention consists in a stirrup of novel construction, and the combination therewith of a screw, a nut, a coupling, and an extension pipe or rod, whereby facility is afforded for securing steam or gas pipes in place close to a ceiling or wall, or suspending them at any desired distance therefrom.

In the accompanying drawing, Figure 1 is a side view, illustrating my invention in one position. Fig. 2 is a sectional view, illustrating the invention in another position.

The stirrup A is made of metal, and may be of any suitable exterior shape or outline. In the lower portion is a ring, $b$, for the reception of a steam or gas pipe. In the upper side or edge of the stirrup is an eye, $c$, for the reception of a bolt or screw. Between the ring $b$ and the eye $c$ is an open space, $d$, for the admission of a nut, which space may be large enough to admit the jaws of a wrench. E represents a screw or bolt, with a thread, $e$, on its upper portion for engagement with wood, and a finer thread, $f$, on its lower portion for engagement with a nut or a coupling. G represents a section of steam or gas pipe, and H a "coupling," such as used for connecting two sections of such pipes.

The pipes and couplings used by steam and gas fitters are made of standard sizes, with standard screw-threads formed thereon; and the workmen are provided with tools for cutting pipes and for forming screw-threads thereon, so that when engaged in putting up pipes they may readily supply themselves with pieces of the desired length, and with means for connecting them. The screw or bolt E shown herein is made to correspond with one of the standard sizes of pipe, and its lower thread $f$ to correspond with the standard thread on such pipe and coupling. The nut F is also provided with a standard thread, so as to fit the thread on either the bolt E or pipe G.

In using this invention the screw or bolt E is inserted in the wall or ceiling. If the steam or gas pipes are to be secured near to the wall or ceiling the lower end of the bolt is passed through the eye $c$, and the nut F is screwed thereon, so as to hold the stirrup in place, as shown in Fig. 1, in which case the stirrup may be placed close against the surface of the wall. If the pipes are to be suspended at a distance below the ceiling a pipe, G, is cut to the desired length and attached to the bolt E by a coupling, H. The lower end of the pipe G is then passed through the eye $c$, and the nut F is screwed on said pipe, as shown in Fig. 2.

By this invention a workman is provided with means, which may always be accessible, whereby he is enabled to attach pipes at any required distance from the ceiling or wall, in either a horizontal or inclined position, as may be desired.

What I claim as new, and desire to secure by Letters Patent, is—

1. The stirrup A, in combination with the screw or bolt E, and nut F, substantially as herein set forth.

2. The combination, with a stirrup, A, screw or bolt E, thread $f$, and nut F, of the extension-piece G and coupling H, substantially as and for the purpose herein described.

GEO. W. BLAKE.

Witnesses:
BENJAMIN W. HOFFMAN,
FRED. HAYNES.